(12) United States Patent
Ridgeway et al.

(10) Patent No.: US 11,460,830 B2
(45) Date of Patent: Oct. 4, 2022

(54) SCARF REPAIR APPARATUS, SYSTEM, AND METHOD

(71) Applicant: The Boeing Company, Chicago, IL (US)

(72) Inventors: Larry D. Ridgeway, Snohomish, WA (US); James H. Henderson, Arlington, WA (US); Michael A. Lazar, Arlington, WA (US); Steve J. Morse, Gig Harbor, WA (US); David J. Hengy, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 210 days.

(21) Appl. No.: 16/830,841

(22) Filed: Mar. 26, 2020

(65) Prior Publication Data

US 2021/0302937 A1 Sep. 30, 2021

(51) Int. Cl.
*G05B 19/4099* (2006.01)
(52) U.S. Cl.
CPC ............ *G05B 19/4099* (2013.01); *G05B 2219/37355* (2013.01); *G05B 2219/37441* (2013.01)
(58) Field of Classification Search
CPC ............ B23C 2215/04; B23C 2220/32; B23C 2226/27; B23C 3/16; B23Q 35/10; B29C 2073/264; B29C 73/10; B29C 73/26; G05B 19/4099; G05B 2219/37355; G05B 2219/37441
See application file for complete search history.

(56) References Cited

U.S. PATENT DOCUMENTS

| 3,922,950 A | 12/1975 | Walter |
| 4,268,949 A | 5/1981 | Sato |
| 8,977,528 B2 | 3/2015 | Greenberg et al. |
| 9,720,398 B2 | 8/2017 | Bain et al. |
| 10,065,318 B2 | 9/2018 | Bain et al. |
| 2002/0053371 A1* | 5/2002 | Pikna ............... B23Q 35/102 144/144.1 |
| 2011/0036482 A1* | 2/2011 | Stenbaek ............ B29C 73/10 156/98 |
| 2016/0075028 A1* | 3/2016 | Bain .................. B25J 9/1684 901/41 |

(Continued)

OTHER PUBLICATIONS

Gemini Wood Carver Specifications and Pricing, pp. 1-4, https://wood-carver.com/unispecs.html accessed Mar. 26, 2020.

(Continued)

*Primary Examiner* — Yuhui R Pan
(74) *Attorney, Agent, or Firm* — Kunzler Bean & Adamson

(57) ABSTRACT

Disclosed herein is a duplicator assembly for forming a first void, which can be layered, in a laminated material of a part that matches a second void in a scarf repair guide. The duplicator assembly comprises an arm that comprises a first end portion and a second end portion. The first end portion is spaced apart from the second end portion. The duplication assembly also comprises a probe that is fixed to the first end portion of the arm and configured to trace the second void in the scarf repair guide. The duplication assembly further comprises a milling tool that is fixed to the second end portion of the arm such that the milling tool is co-movably coupled with the probe via the arm.

20 Claims, 11 Drawing Sheets

(56) References Cited

U.S. PATENT DOCUMENTS

2016/0339652 A1  11/2016  Safai et al.

OTHER PUBLICATIONS

Gardiner, Aircraft composites repair moves toward maturity, Composites World, pp. 1-10, https://www.compositesworld.com/articles/aircraft-composites-repair-moves-toward-maturity accessed Mar. 26, 2020.
Extended European Search Report for European Patent Application No. 21163595.8 dated Aug. 26, 2021.

* cited by examiner

SCARF REPAIR APPARATUS, SYSTEM, AND METHOD

FIELD

This disclosure relates generally to repairing parts with abnormalities, and more particularly to repairing laminated parts using a scarf repair apparatus, system, and process.

BACKGROUND

Many structures are made of fiber-reinforced polymers because of their high strength and low weight. However, repairing damage to fiber-reinforced polymer parts can be complicated, time-intensive, and expensive. Although some techniques, such as scarf repair techniques, have been designed specifically to repair fiber-reinforced polymer parts, such techniques still suffer from several shortcomings. For example, conventional void forming techniques do not accurately estimate the size (e.g., depth and shape) of abnormalities and thus are unable to accurately determine the size of a void in the part that accommodates the removal of the abnormality. Accordingly, in some conventional scarf repair techniques, the size of the void is estimated and manually formed to be larger (e.g., wider and deeper) to ensure the abnormality is sufficiently removed, which may lead to an unnecessary waste of the laminated material of the part and a reduction in the structural integrity of the part. In addition, manually scarfing plies using conventional methods introduces variation and can negatively affect the appearance of the overall repair.

SUMMARY

The subject matter of the present application has been developed in response to the present state of the art, and in particular, in response to the shortcomings of conventional scarf repair techniques that have not yet been fully solved by currently available techniques. Accordingly, the subject matter of the present application has been developed to provide an apparatus, system, and method that overcome at least some of the above-discussed shortcomings of prior art techniques. For example, the apparatus, system, and method described herein promotes accuracy, a reduction in material and labor losses, and a reduction in the variation inherent in conventional manual scarfing processes by providing a significant improvement in the appearance of the repair area.

The following is a non-exhaustive list of examples, which may or may not be claimed, of the subject matter, disclosed herein.

Disclosed herein is a duplicator assembly for forming a first void in a laminated material of a part that matches a second void in a scarf repair guide. The duplicator assembly comprises an arm, comprising a first end portion and a second end portion. The first end portion is spaced apart from the second end portion. The duplication assembly also comprises a probe that is fixed to the first end portion of the arm and configured to trace the second void in the scarf repair guide. The duplication assembly further comprises a milling tool, fixed to the second end portion of the arm such that the milling tool is co-movably coupled with the probe via the arm. The preceding subject matter of this paragraph characterizes example 1 of the present disclosure.

The duplicator assembly further comprises a handle fixed to the first end portion. The handle is co-movably coupled with the probe. The preceding subject matter of this paragraph characterizes example 2 of the present disclosure, wherein example 2 also includes the subject matter according to example 1, above.

The probe is movable relative to the arm in response to a contour change of the second void in the scarf repair guide. The milling tool is pivotably coupled with the second end portion. The milling tool pivots relative to the arm in response to the probe moving relative to the arm. The preceding subject matter of this paragraph characterizes example 3 of the present disclosure, wherein example 3 also includes the subject matter according to any one of examples 1-2, above.

The duplicator assembly further comprises an articulatable arm coupled to the arm. The articulatable arm is manually movable relative to the part and the scarf repair guide to manually move the arm relative to the part and the scarf repair guide. The preceding subject matter of this paragraph characterizes example 4 of the present disclosure, wherein example 4 also includes the subject matter according to any one of examples 1-3, above.

The articulatable arm is manually movable about at least three axes of rotation such that the probe and the milling tool are manually movable about the at least three axes of rotation. The preceding subject matter of this paragraph characterizes example 5 of the present disclosure, wherein example 5 also includes the subject matter according to example 4, above.

The arm, the probe, and the milling tool form an arm assembly. The arm assembly is selectively releasably coupled to the articulatable arm. The preceding subject matter of this paragraph characterizes example 6 of the present disclosure, wherein example 6 also includes the subject matter according to any one of examples 4-5, above.

Further disclosed herein is a system for forming a first void in a laminated material of a part to repair the part. The system comprises a scarf repair guide that is non-movably fixed relative to the part and comprises a second void. The first void matches the second void. The system also comprises an arm assembly. The arm assembly comprises an arm that comprises a first end portion and a second end portion. The first end portion is spaced apart from the second end portion. The arm assembly also comprises a probe that is fixed to the first end portion of the arm and configured to trace the second void in the scarf repair guide. The arm assembly further comprises a milling tool that is fixed to the second end portion of the arm such that the milling tool is co-movably coupled with the probe via the arm. The milling tool is configured to form the first void in the part to match the second void in the scarf repair guide as the probe traces the second void in the scarf repair guide. The preceding subject matter of this paragraph characterizes example 7 of the present disclosure.

The system further comprises a scarf repair modeling module that is configured to generate a digital scarf repair model based at least partially on data corresponding with an abnormality in the part. The system also comprises a scarf repair guide forming tool that is configured to make the scarf repair guide based on the digital scarf repair model. The preceding subject matter of this paragraph characterizes example 8 of the present disclosure, wherein example 8 also includes the subject matter according to example 7, above.

The scarf repair guide forming tool comprises an additive manufacturing machine. The preceding subject matter of this paragraph characterizes example 9 of the present disclosure, wherein example 9 also includes the subject matter according to example 8, above.

The system further comprises a defect modeling module that is configured to generate a computer-aided design (CAD) model of at least the abnormality in the part based on the data corresponding with the abnormality in the part. The scarf repair modeling module is further configured to generate the digital scarf repair model based at least partially on the CAD model. The preceding subject matter of this paragraph characterizes example 10 of the present disclosure, wherein example 10 also includes the subject matter according to any one of examples 8-9, above.

The scarf repair modeling module is further configured to generate the digital scarf repair model according to scarf repair parameters defined prior to generating the CAD model of at least the abnormality in the part. The preceding subject matter of this paragraph characterizes example 11 of the present disclosure, wherein example 11 also includes the subject matter according to example 10, above.

The system further comprises a scanning tool that is configured to scan the part to generate the data corresponding with the abnormality in the part. The preceding subject matter of this paragraph characterizes example 12 of the present disclosure, wherein example 12 also includes the subject matter according to any one of examples 10-11, above.

The arm assembly is further configured to form the first void in a surface of the part and the scarf repair guide is non-movably attached to the surface of the part. The preceding subject matter of this paragraph characterizes example 13 of the present disclosure, wherein example 13 also includes the subject matter according to any one of examples 7-12, above.

Additionally disclosed herein is a method of making a scarf repair guide for repairing a laminated material of a part. The method comprises scanning at least a portion of the part containing an abnormality. The method also comprises generating data corresponding with the abnormality in response to scanning at least the portion of the part containing the abnormality. The method further comprises generating a digital scarf repair model based at least partially on the data corresponding with the abnormality. The method additionally comprises making the scarf repair guide based on the digital scarf repair model. The preceding subject matter of this paragraph characterizes example 14 of the present disclosure.

The method further comprises generating a computer-aided design (CAD) model of at least the abnormality in the part based on the data corresponding with the abnormality. The digital scarf repair model is generated based on the CAD model. The preceding subject matter of this paragraph characterizes example 15 of the present disclosure, wherein example 15 also includes the subject matter according to example 14, above.

The data corresponding with the abnormality comprises an orientation of the part, a location of the abnormality on the part, and a shape of the abnormality. The preceding subject matter of this paragraph characterizes example 16 of the present disclosure, wherein example 16 also includes the subject matter according to any one of examples 14-15, above.

Also disclosed herein is a method of repairing a laminated material of a part. The method comprises tracing a second void, of a scarf repair guide non-movably fixed relative to the part, with a probe. The method also comprises co-moving a milling tool with the probe as the probe traces the second void. The method further comprises removing the laminated material of the part with the milling tool as the milling tool co-moves with the probe to form a first void in the laminated material of the part that matches the second void in the scarf repair guide. The preceding subject matter of this paragraph characterizes example 17 of the present disclosure.

The step of tracing the second void with the probe comprises moving the probe according to any one of at least three degrees of freedom. The step of co-moving the milling tool comprises movement of the milling tool according to any one of the at least three degrees of freedom. The preceding subject matter of this paragraph characterizes example 18 of the present disclosure, wherein example 18 also includes the subject matter according to example 17, above.

The step of tracing the second void with the probe comprises pivoting the probe in response to a contour change of the second void in the scarf repair guide. The step of co-moving the milling tool comprises co-pivoting the milling tool with the probe. The preceding subject matter of this paragraph characterizes example 19 of the present disclosure, wherein example 19 also includes the subject matter according to any one of examples 17-18, above.

The step of tracing the second void with the probe comprises manually moving the probe along the second void. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 9:
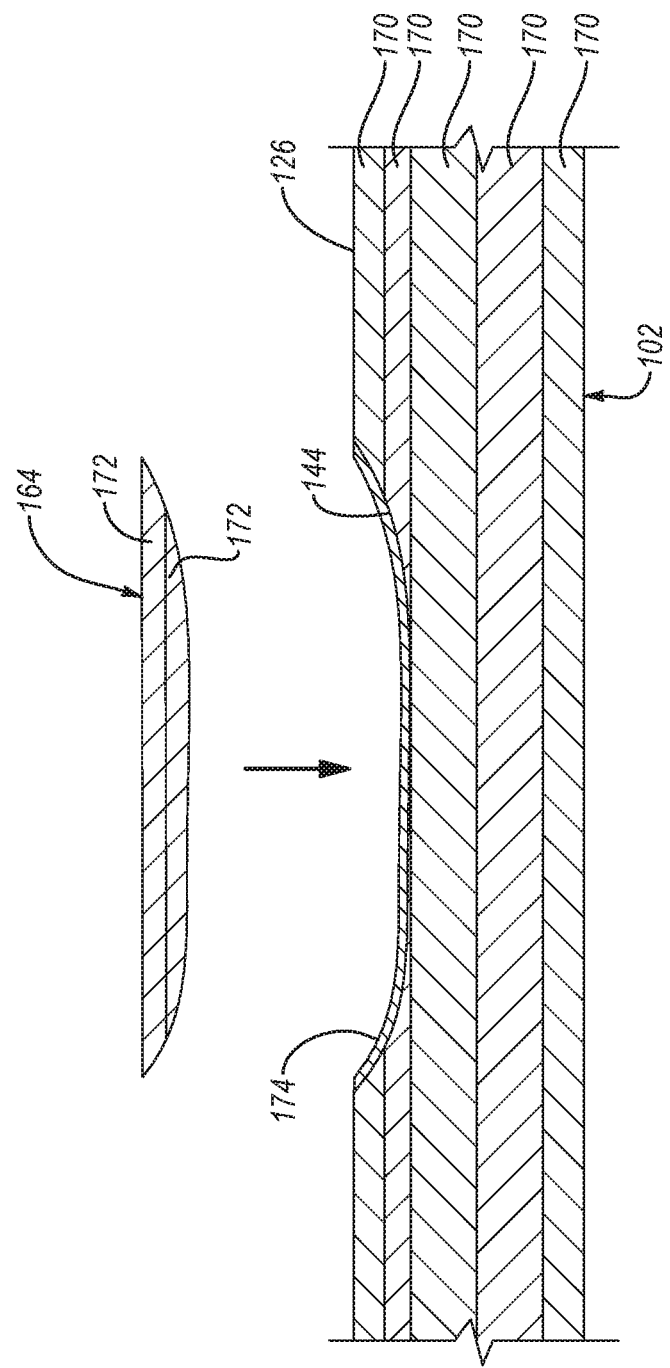
FIG. 9 is a cross-sectional side elevation view of a repair patch being coupled to a void formed in a part, according to one or more examples of the present disclosure.
Figure 10:
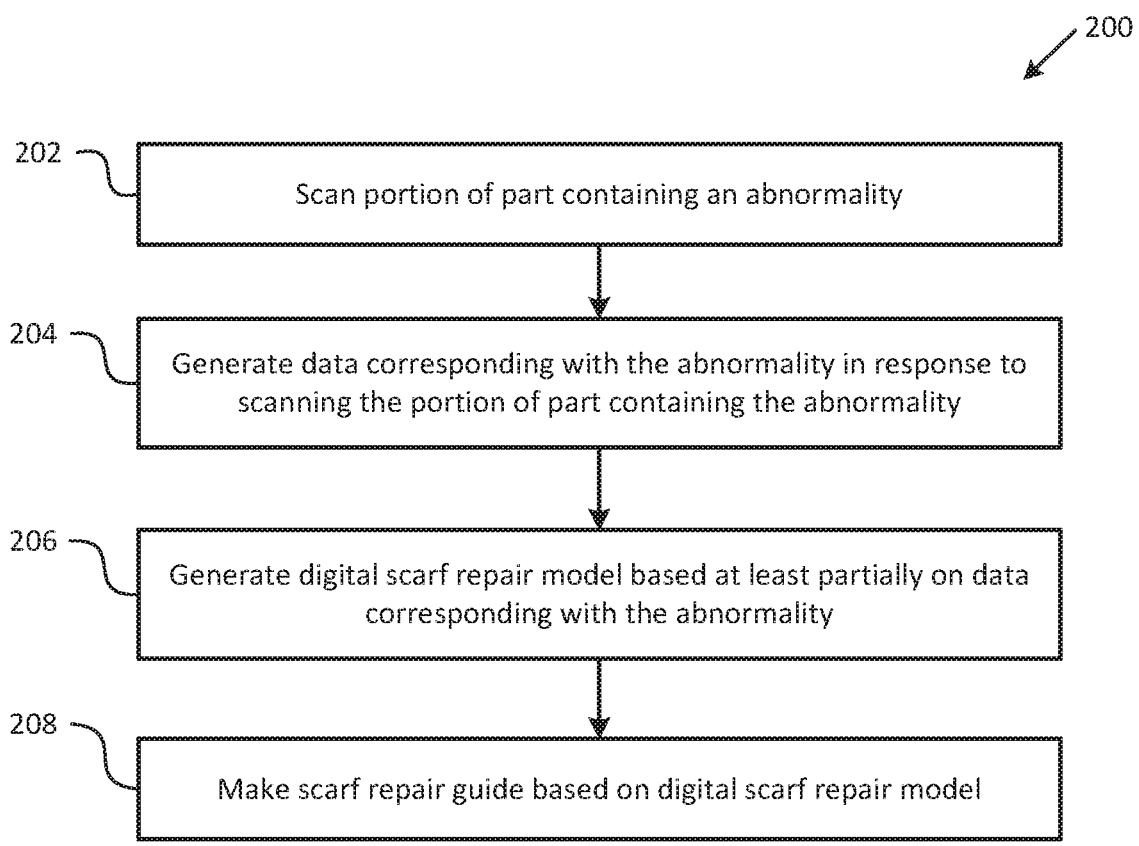
FIG. 10 is a schematic flow chart of a method of making a scarf repair guide for repairing a laminated material of a part, according to one or more examples of the present disclosure.

Disclosed herein is a system, assembly, and methods that improve the repairing of laminated parts. More specifically, the system, assembly, and methods disclosed herein promote the simplification, ease, and accuracy of scarf repairing a laminated material of a part. Referring to FIG. 9, one example of a scarf repair method is illustrated. Generally, a scarf repair includes removing an abnormality in the laminated material, by removing the laminated material in which the abnormality is located, and replacing the removed laminated material with a repair patch. As shown in FIG. 9, the laminated material (e.g., composite structure) of a part 102 includes multiple layers 170 or plies bonded together in a stacked formation. The part 102 can be or form part of a larger structure, such as an aircraft, another vehicle (e.g., helicopter, boat, spacecraft, automobile, etc.), or a non-mobile complex structure (e.g., building, bridge, machinery, etc.).

Figure 1:
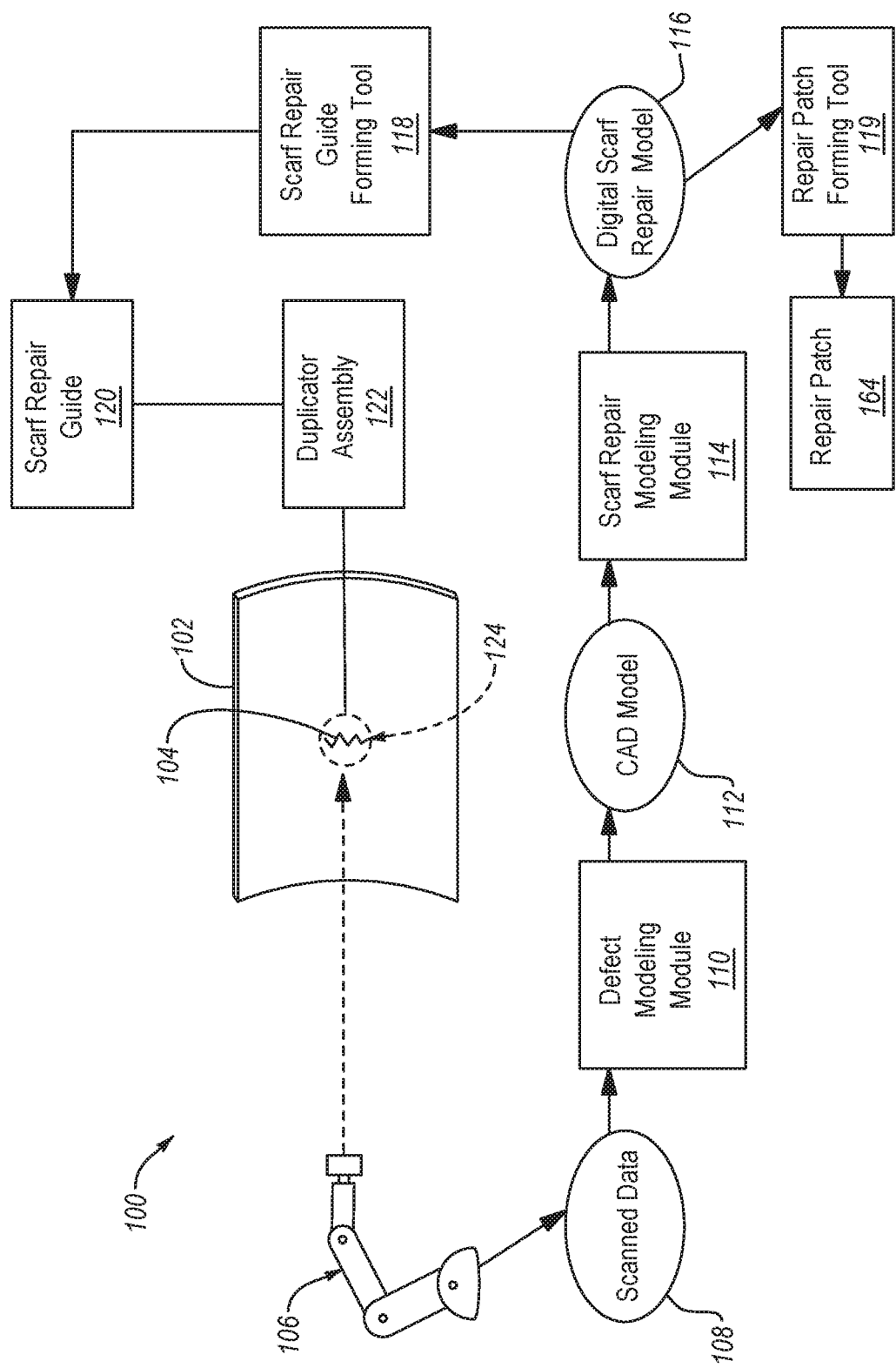
FIG. 1 is a schematic block diagram of a system for repairing a part, according to one or more examples of the present disclosure.

The laminated material of the part 102 may have an abnormality 104 (see, e.g., FIG. 1). The abnormality 104 can be any of various abnormalities that may affect the performance or structural integrity of the part. For example, the abnormality 104 can be a crack or a disbond that develops over time and continued use of the part 102. In alternative examples, the abnormality 103 can be a manufacturing defect. Accordingly, the abnormality 104 can have any of various shapes and sizes and be any of various types. For parts made of a laminated material, the abnormality 104 can through multiple plies of the laminated material. To eliminate the abnormality 104 and ensure safe and continued use of the part 102, the part 102 can be repaired using a scarf repair method. According to certain examples, the scarf repair method includes removing a damaged portion of the part 102 (e.g., the portion of the part 102 containing the abnormality 104) to form a void 144 in the part 102 (see, e.g., FIG. 9). The void 144 formed in the part 102 extends from a surface 126 of the part 102. The surface 126 is an outer or exterior surface of the part 102 in one example and an inner or interior surface of the part 102 in another example. Although show in FIG. 9 as extending only partially through a thickness of the part 102, such that the void 144 is considered a blind void, in certain examples, the void 144 extends entirely through the thickness of the part 102, such that the void 144 is considered a through-void.

The side or surface of the part 102 defining the void 144 is tapered to define an angle with the surface 126 of the part 102. The tapering of the surface of the part 102 defining the void 144 results in a convergence of the surface of the void 144 in a direction extending away from the surface 126 through the thickness of the part 102. The void 144 is tapered to promote bonding between the part 102 and a repair patch 164 (see, e.g., FIG. 9) inserted into the void 144 and to improve load distribution between the part 102 and the repair patch 164. In certain examples, the scarf repair method includes positioning an adhesive layer 174 over or into the void 144 before the repair patch 164 is inserted. In this position, the adhesive layer 174 is interposed between the part 102 and the repair patch 164 when the repair patch 164 is positioned within the void 144. The adhesive layer 174 promotes secure fixed engagement between the repair patch 164 and the part 102, as well as provides a medium for load distribution between the part 102 and the repair patch 164. The adhesive layer 174 is a flexible film adhesive sheet made of any of various adhesive materials, such as epoxy, in some examples.

The void 144 is tapered to promote the restoration of the structural integrity of the part 102. When the void 144 extends into multiple layers 170 of the laminated material of the part 102, such as shown, in certain examples, the repair patch 164 includes multiple layers 172 that may or may not correspond with the multiple layers 170 of part 102. Generally, the taper needed to restore the structural integrity of the part 102 corresponds with the strength of the repair patch 164 (e.g., the strength the layers 172 of the repair patch 164). For example, conventional scarf repair processes for repairing composite structures may use a void with a length-to-depth taper ratio of between 28:1 and 32:1 and may get as low as between 15:1 and 20:1.

Generally, the smaller the taper of the void 144 or the smaller the void 144, the less material that is removed from the part 102, promoting structural integrity of the part 102 by keeping more of the part 102 intact, and results in less time and labor making the repair and less material in the repair patch 164, promoting a decrease in material costs and labor. However, conventional void forming techniques do not accurately estimate the size (e.g., depth and shape) of abnormalities and thus are unable to accurately determine the size of the void that accommodates the removal of the abnormality. Accordingly, in conventional void forming techniques, void size is guessed and manually formed to be larger (e.g., wider and deeper) than needed to ensure the abnormality is sufficiently removed, which may lead to an unnecessary waste of the laminated material of the part 102 and a reduction in the structural integrity of the part 102. The system, assembly, and methods disclosed herein, among other advantages, help to accurately determine the size of the void that accommodates the removal of the abnormality and thus promote a reduction in removed material of the part 102 and an increase in the structural integrity of the part 102 following a scarf repair.

Referring to FIG. 1, according to certain examples, a system 100 for forming the void 144 in a laminated material of the part 102 is shown. The system 100 includes a scanning tool 106 that is configured to scan the part 102 and generate scanned data 108 based on the scan of the part 102. As depicted in FIG. 1, the scanning tool 106 is an autonomous robot (e.g., robotic arm) in one example. The autonomous robot includes an end effector with a scanning head. The scanning head includes one or more cameras or sensors operable to detect one or more characteristics of the part 102 and/or characteristics of the abnormality 104. The scanning tool 106, which can include any of various computer processors, controllers, and the like, detects and assigns the one or more characteristics of the part 102 and/or characteristics of the abnormality 104 as the scanned data 108. Accordingly, the scanned data 108 includes data corresponding with the abnormality 104 in the part 102.

In certain examples, the scanning head includes one or more transmitters that transmit a signal, such as an optical signal (e.g., laser signal, infrared signal, etc.), a sound signal (e.g., ultrasonic signal), or an electromagnetic signal (e.g., radio-frequency identification (RFID) signal), at the part 102 and one or more receivers that receive corresponding reflected signals from the part. Based on a comparison between the characteristics of the signal transmitted at the part 102 and corresponding characteristics of the signal reflected from the part 102, the characteristics of the part 102 and/or the characteristics of the abnormality 103 are detected.

In certain examples, the characteristics of the part that are detectable by the scanning tool 106 include, but are not limited to, an alignment position (e.g., orientation) of the part 102 with respect to an orientation of the structure (e.g., aircraft) that includes the part 102, data points on the part 102 to sync with a preexisting computer-aided design (CAD) model of the part 102, and the like. In certain examples, the scanning tool 106 can scan the same, or different, characteristics of any other parts/models within reach of the volumetric footprint of the scanning tool 106 to help aid in acquiring useful scanning data for modeling and making the scarf repair guide 120. According to the same or other examples, the characteristics of the abnormality 104 that are detectable by the scanning tool 106 include, but are not limited to, the location of the abnormality 104 on the part 102, the total area of the abnormality 104, the shape of the abnormality 104, the depth of the abnormality 104, the type of abnormality 104, and the like.

Although depicted as an autonomous robot in FIG. 1, according to some examples, the scanning tool 106 is an a manually operated tool, such as a hand-held tool or a manually movable tool. Like the autonomous robot, the manually operated tool can have a scanning head that includes one or more cameras or sensors operable to detect one or more characteristics of the part 102 and/or characteristics of the abnormality 104.

The system 100 additionally includes a defect modeling module 110 that is configured to generate a CAD model 112 of the abnormality 104 in the part 102. The CAD model 112 includes at least the abnormality 104 in the part 102. In some examples, the CAD model 112 also include the portion of the part 102 in which the abnormality 104 is formed, such as the portion of the part 102 surrounding the abnormality 104. According to certain examples, the CAD model 112 includes the entirety of the part 102 in which the abnormality 104 is formed, and in some cases, may include the entire structure (e.g., aircraft) containing the part 102. After optionally aligning and parsing the scanned data 108 for outlier information, the defect modeling module 110 generates the CAD model 112 based on the scanned data 108 (e.g., data corresponding with the abnormality 104 in the part 102). In some examples, the defect modeling module 110 generates the CAD model 112 based additionally on a preexisting CAD model of the part 102. In effect, the defect modeling module 110 can be configured to digitally incorporate the abnormality 104 into the preexisting CAD model of the part 102 to generate the CAD model 112. In some examples, the defect modeling module 110 relies on features of CAD modeling software (e.g., CATIA®, Solidworks®, AutoCAD®, Pro/ENGINEER®, and the like) to model the abnormality 104 into a model of the part 102. Alternatively, in certain examples, the defect modeling module 110 creates a new model of the part 102 without relying on any preexisting CAD models of the part 102, such as by using laser measurement techniques.

The system 100 also includes a scarf repair modeling module 114 that is configured to generate a digital scarf repair model 116 based at least partially on the CAD model 112 generated by the defect modeling module 110. Because the CAD model 112 is generated based on the scanned data 108, the digital scarf repair model correspondingly is generated based on the scanned data 108. The digital scarf repair model 116 is a digital model of a physical scarf repair guide 120 that will be used to repair the part 102. Accordingly, the digital scarf repair model 116 includes features of the scarf repair guide 120 for executing the scarf repair of the part 102, such as the configuration of a void 142 in the scarf repair guide 120. In some examples, the digital scarf repair model 116 also includes other features, such as the configuration of a part engagement surface 152 of the scarf repair guide 120, that help facilitate the scarf repair of the part 102.

In some examples, the scarf repair modeling module 114 generates the digital scarf repair model 116 according to scarf repair parameters defined prior to generating the CAD model 112. The scarf repair parameters can be predefined parameters based on standard or proven methods of scarf repairing various types and sizes of abnormalities in a part of various materials and sizes. Moreover, in some examples, the scarf repair modeling module 114 includes CAD modeling software (e.g., CATIA®) that utilizes the predefined parameters and compares them against the CAD model 112 of the abnormality 104 to generate the digital scarf repair model 116. According to certain examples, the scarf repair modeling module 114 includes a look-up table of abnormality and part characteristic values and associated scarf repair parameter values. For example, the look-up table can include depth, area (e.g., diameter), shape, and taper (e.g., depth-to-taper) values of the void 144 for removing an abnormality having given characteristics (e.g., crack or disbond and associated size or shape) and a part having given characteristics (e.g., composite material type, number of plies, thickness of plies, orientation of plies, etc.). In another example, the void representation may be formed by CAD modeling software based on the underlying ply geometry and defect size and depth. By taking into account the original configuration of the laminate, the void volume may be optimized to reduce the amount of material removed and thereby reduce structural impact, labor, and material costs. Because the detection and modeling of the abnormality 104 in the part 102 is precise, the modeling of the scarf repair guide 120, and the void 142 of the scarf repair guide 120, also is a precise representation of the void in the part for accommodating precise removal of the abnormality 104 without wasting material.

The system 100 further includes a scarf repair guide forming tool 118 that is configured to make a scarf repair guide 120. The scarf repair guide forming tool 118 utilizes the digital scarf repair model 116, generated by the scarf repair modeling module 114, to make the scarf repair guide 120. More specifically, in certain examples, the scarf repair guide forming tool 118 is an automated manufacturing tool that automatically makes the scarf repair guide 120 based on CNC (computer numerical control) programming code (e.g., G-code and M-code) derived from the digital scarf repair model 116. In one example, the scarf repair guide forming tool 118 is an additive manufacturing machine or another CNC machine. As used herein, the void 142 of the scarf repair guide 120 is not necessarily a void in the sense that material has been removed from the scarf repair guide 120 to create an empty space, but rather the void 142 is a feature or template that is formed in the scarf repair guide 120 help form a void in a part. Accordingly, the term void is used to define the template or feature in the scarf repair guide 120 merely for consistency in associating the template or feature with the void to be formed in the part.

According to some examples, the system 100 disclosed above is capable of executing a method 200 of making the scarf repair guide 120 for repairing the part 102. Referring to FIG. 9, the method 200 includes (block 202) scanning at least a portion of the part 102 that contains the abnormality 104. In one example, the step of scanning, at block 202, is performed by the scanning tool 106. The method 200 also includes (block 204) generating the scanned data 108 in response to scanning, at block 202, at least the portion of the part 102 that contains the abnormality 104. The method 200 additionally includes (block 206) generating the digital scarf repair model 116 based at least partially on the scanned data 108. In one example, the step of generating the digital scarf repair model 116, at block 206, is performed by the scarf repair modeling module 114. The method 200 further includes (block 208), making the scarf repair guide 120 based on the digital scarf repair model 116. According to one example, the step of making the scarf repair guide 120, at block 208, is performed by the scarf repair guide forming tool 118.

In some examples, the system 100 also includes a repair patch forming tool 119. The repair patch forming tool 119 is configured to make a repair patch 164 for plugging the void 144 formed in the part 102 as part of the scarf repair process. In some implementations, the repair patch forming tool 119 is an automated manufacturing tool that automatically makes the repair patch 164 based on CNC programming code derived from the digital scarf repair model 116. Accordingly, in certain examples, the scarf repair modeling module 114 is configured to include a digital model of the repair patch 164 in the digital scarf repair model 116 in addition to the digital model of the scarf repair guide 120. In one example, the repair patch forming tool 119 is a CNC machine or an additive manufacturing machine and can be the same tool as the scarf repair guide forming tool 118.

The system 100 additionally includes a duplicator assembly 122 that utilizes the scarf repair guide 120, made by the scarf repair guide forming tool 118, to form the void 144 in the part 102. The duplicator assembly 122 is configured to, in effect, duplicate the void 142 of the scarf repair guide 120 in the part 102. Accordingly, the duplicator assembly 122 is operable to form a void in the part 102 that matches the void 142 in the scarf repair guide 120. In this manner, the void 144 in the part 102 can be made with precision, which reduces wasted material and resources.

Referring to FIGS. 2-5, the duplicator assembly 122 includes an arm assembly 132 and an articulatable arm 130. The arm assembly 132 is coupled to the articulatable arm 130 and the articulatable arm 130 is manually movable relative to the part 102 to manually move the arm assembly 132 relative to the part 102. The arm assembly 132 includes an arm 134, a probe 136, and a milling tool 140.

Figure 3:
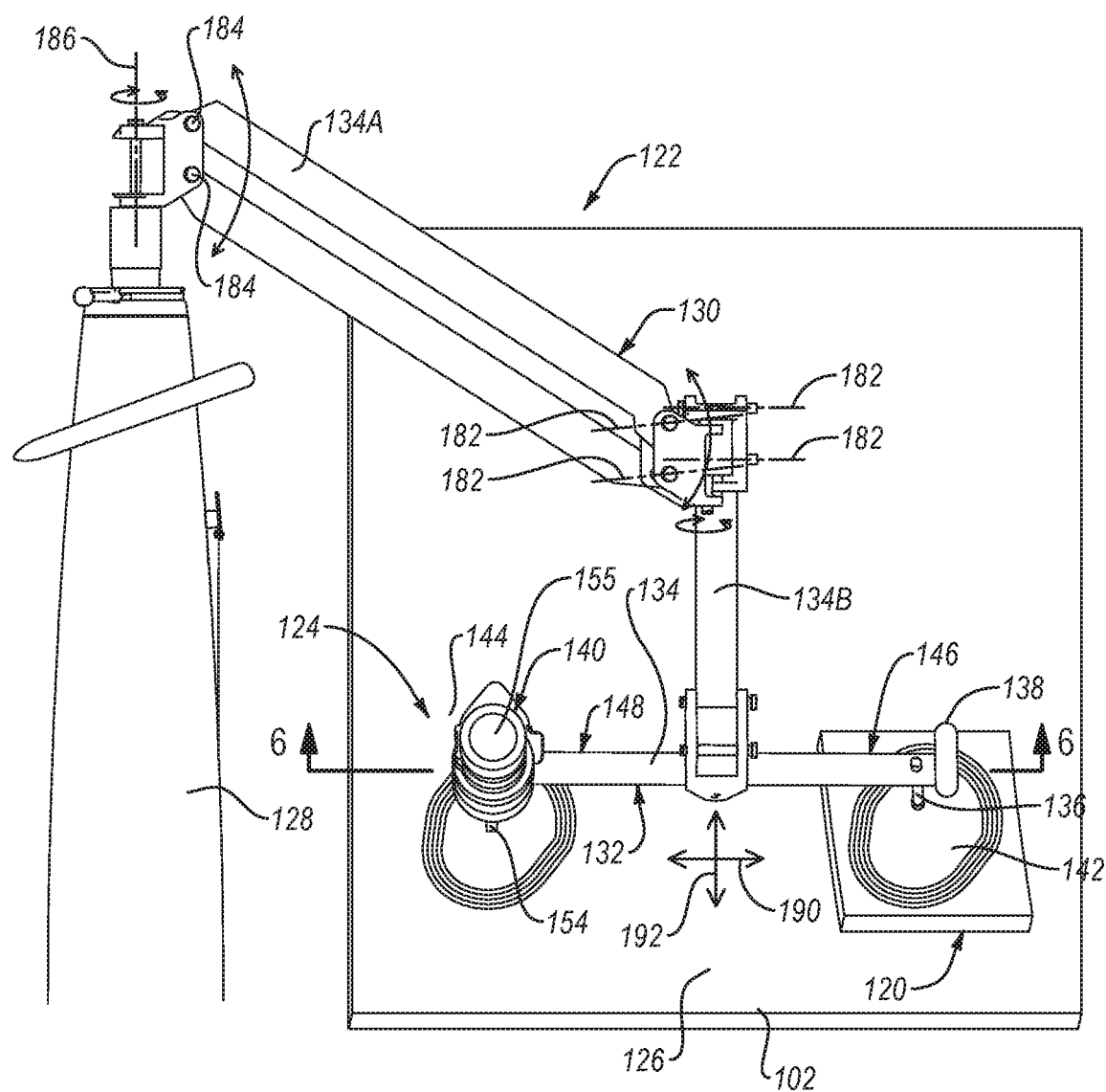
FIG. 3 is a perspective view of the duplicator assembly and the scarf repair guide of the system of FIG. 1, from a rear of the duplicator assembly, according to one or more examples of the present disclosure.
Figure 4:
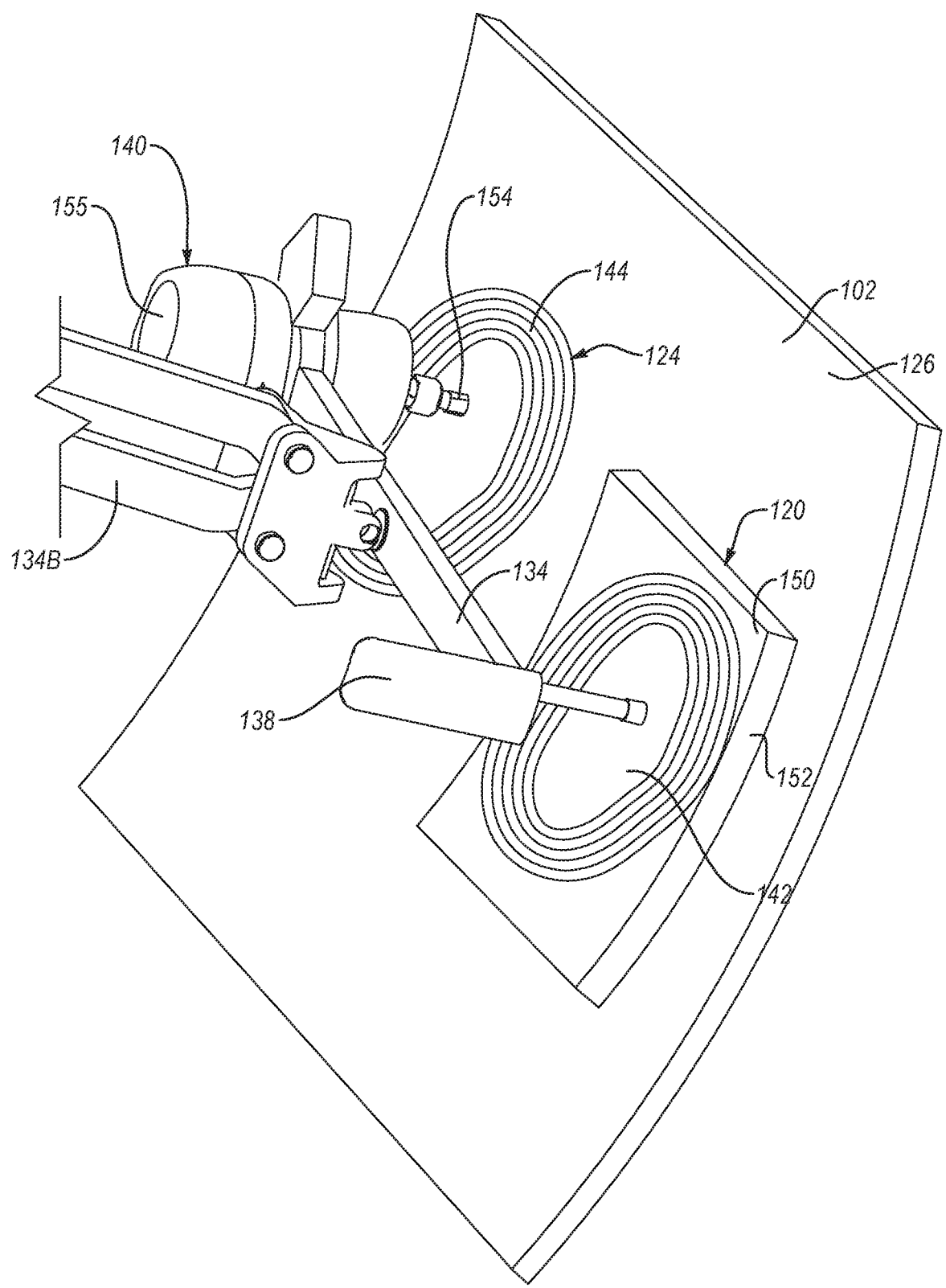
FIG. 4 is a perspective view of the duplicator assembly and the scarf repair guide of the system of FIG. 1, from a second side of the duplicator assembly, according to one or more examples of the present disclosure.

The arm 132 is a rigid and elongated bar that has a first end portion 146 and a second end portion 148 (see, e.g., FIG. 3). The first end portion 146 is opposite and spaced apart from the second end portion 148. The first end portion 146 includes a first end of the arm 132 and the second end portion 148 includes a second end of the arm 132. The second end of the arm 132 is opposite the first end of the arm 132.

Figure 8:
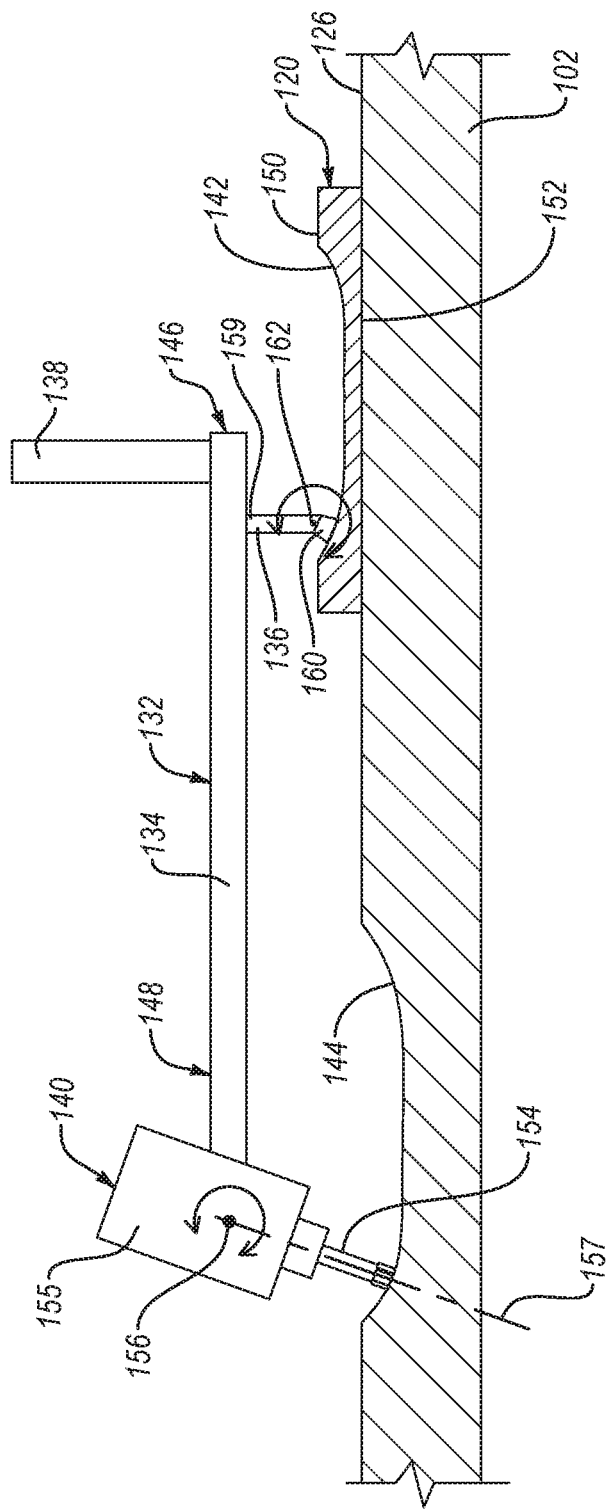
FIG. 8 is a partial cross-sectional side elevation view of an arm assembly of a duplicator assembly of a system for repairing a part, taken along a line similar to line 6-6 of FIG. 3, according to one or more examples of the present disclosure.

The probe 136 is fixed to the first end portion 146 of the arm 134. Generally, the probe 136 is configured to trace the void 142 in the scarf repair guide 120. In the illustrated example of FIG. 3, the probe 136 is a passive, rigid rod that extends from the arm 134 at a substantially perpendicular angle. Accordingly, the probe 136 includes a fixed portion 159 fixed to the first end portion 146 and a tip 167, spaced from the fixed portion, that engages a probe engaging surface 150 of the scarf repair guide 120 (see, e.g., FIG. 6). In one example, the tip 167 of the probe 136 includes a rounded surface that helps to reduce friction between the probe 136 and the probe engaging surface 150 defining the void 142 when the probe 136 is at any of various angles relative to the probe engagement surface 150. Referring to FIG. 8, in some examples, the probe 136 includes a swivelable tip 160 that swivels about a pivot axis 162 as the swiveable tip 160 traces a changing contour of the void 142. In one example, the probe 136 includes a position sensor that senses the position (e.g., angular position) of the swivelable tip 160 relative to the arm 134. The swivelable tip 160 can include one or more biasing springs or switches that help keep the swivelable tip 160 perpendicular to the surface being traced.

Figure 6:
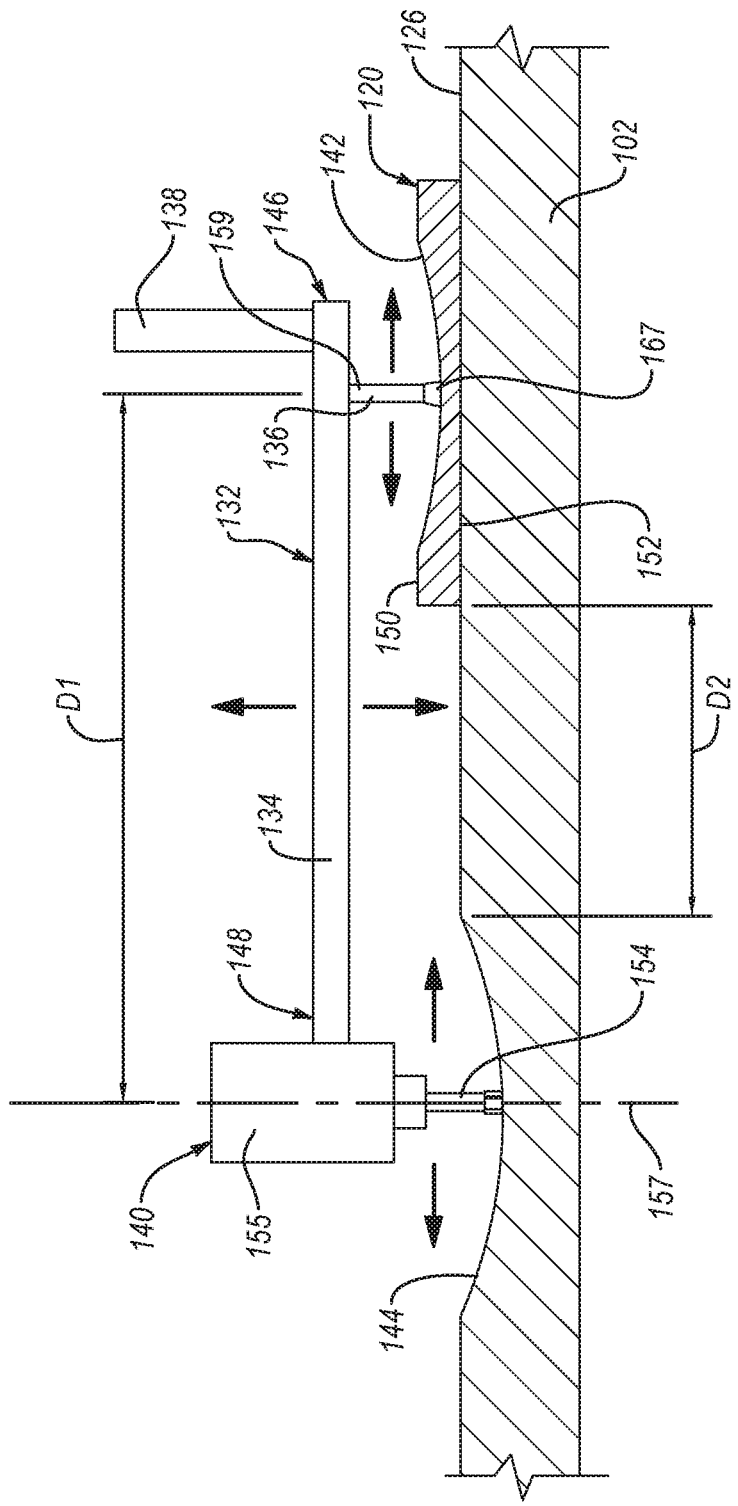
FIG. 6 is a partial cross-sectional side elevation view of an arm assembly of a duplicator assembly of a system for repairing a part, taken along a line similar to line 6-6 of FIG. 3, according to one or more examples of the present disclosure.
Figure 7:
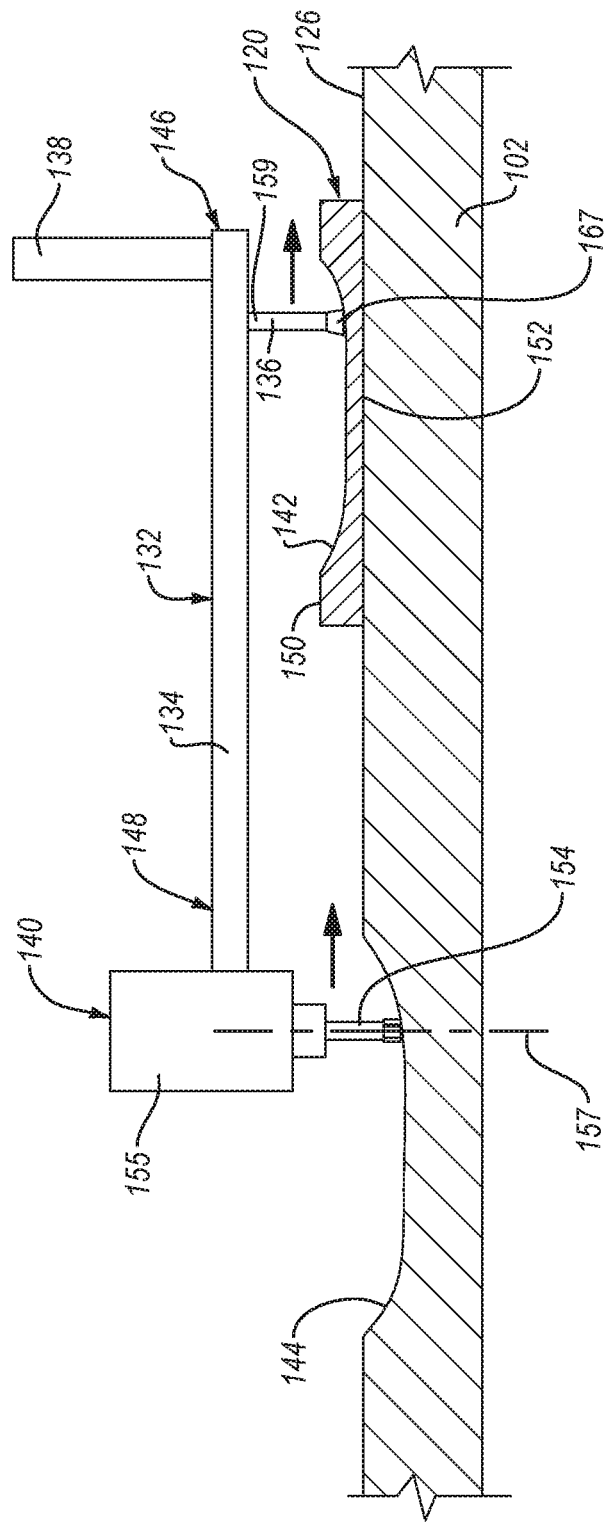
FIG. 7 is a partial cross-sectional side elevation view of the arm assembly of FIG. 6, taken along the line similar to line 6-6 of FIG. 3, according to one or more examples of the present disclosure.

The milling tool 140 is fixed to the second end portion 148 of the arm 134. Accordingly, the milling tool 140 is spaced apart from the probe 136. Because the arm 134 is rigid, the milling tool 140 is co-movable with the probe 136 via the arm 134. In other words, the milling tool 140 moves along with movement of the probe 136. The milling tool 140 is any of various machining tools configured to machine the part 102. Therefore, although the milling tool 140 is termed a 'milling tool', the milling tool 140 can be any of various machining tools other than a milling tool 140. However, in the illustrated example, the milling tool 140 is a machining tool that performs a milling operation on the part 102. Accordingly, the milling tool 140 in the illustrated example includes a motor portion 155 and a bit 154 rotatably driven by the motor portion 155 about a rotational axis 157 concentric with the bit 154. The bit 154 includes cutting blades configured to remove material from the part 102 when rotatably driven into the part 102. The motor portion 155 includes a housing and a rotary motor at least partially housed by the housing. In some examples, as shown in FIGS. 6 and 7, the milling tool 140 is angularly fixed to the arm 134 such that the rotational axis 157 of the bit 154 is angularly fixed relative to the arm 134. However, in other examples, as shown in FIG. 8, the milling tool 140 is movably fixed to the arm 134 such that the rotational axis 157 of the bit 154 is angularly movable relative to the arm 134. Although not shown, angular movement of the milling tool 140 relative to the arm 134 can be facilitated by a servomotor or other rotary actuator.

In some examples, as shown in FIGS. 2-8, the arm assembly 132 further includes a handle 138 fixed to the first end portion 146 of the arm 134. The handle 138 is co-movably coupled with the probe 136 via the arm 134. Accordingly, movement of the handle 138 results in a corresponding movement of the probe 136 and thus the milling tool 140. The handle 138 is configured to be grasped by an operator and manually moved to trace the void 142 of the scarf repair guide 120 as explained in more detail below. Therefore, in some examples, the handle 138 includes grip-enhancing features to facilitate grasping of the handle 138 by an operator. In some implementations, as shown and to promote access to the handle 138, the handle 138 extends from the arm 134 in a direction opposite the direction the probe 136 extends from the arm 134. More specifically, in certain implementations, when the probe 136 extends from the arm 134 toward the part 102, the handle 138 extends from the arm 134 away from the part 102.

The articulatable arm 130 includes a first arm segment 134A and a second arm segment 134B. The second arm segment 134B is co-movably fixed to the arm 134 of the arm assembly 132 such that movement of the probe 136 results in a corresponding movement of the second arm segment 134B. In certain examples, the arm 134 is selectively releasably coupleable to the second arm segment 134B, such that the arm assembly 132 is selectively releasably coupleable to the second arm segment 134B. Such a configuration allows multiple, differently configured (e.g., differently sized, different bits, etc.) arm assemblies 132 to be interchangeably coupleable with the second arm segment 134B to facilitate interchangeable formation of differently configured voids in the part 102.

Figure 2:
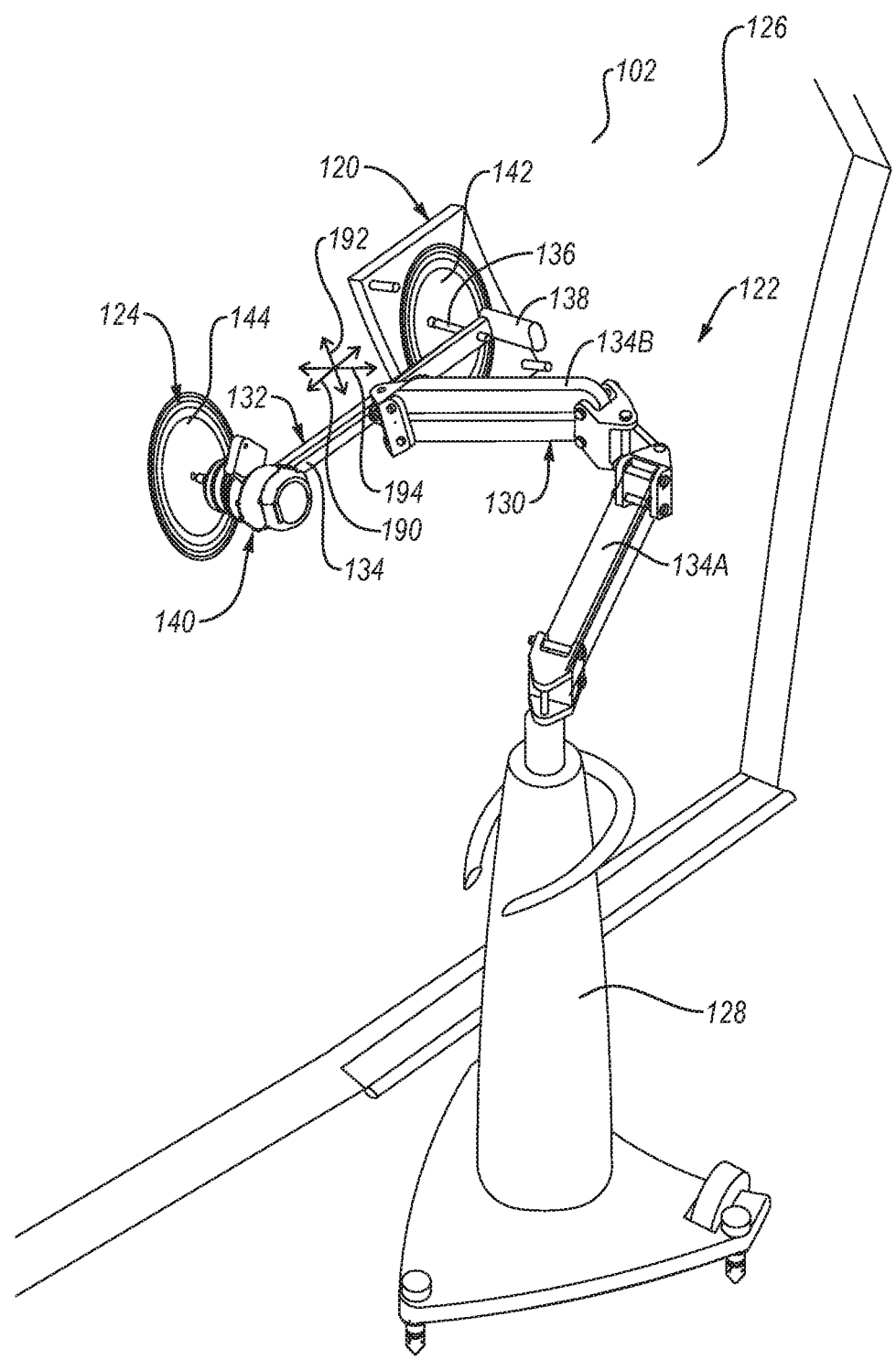
FIG. 2 is a perspective view of a duplicator assembly and a scarf repair guide of the system of FIG. 1, from a first side of the duplicator assembly, according to one or more examples of the present disclosure.
Figure 5:
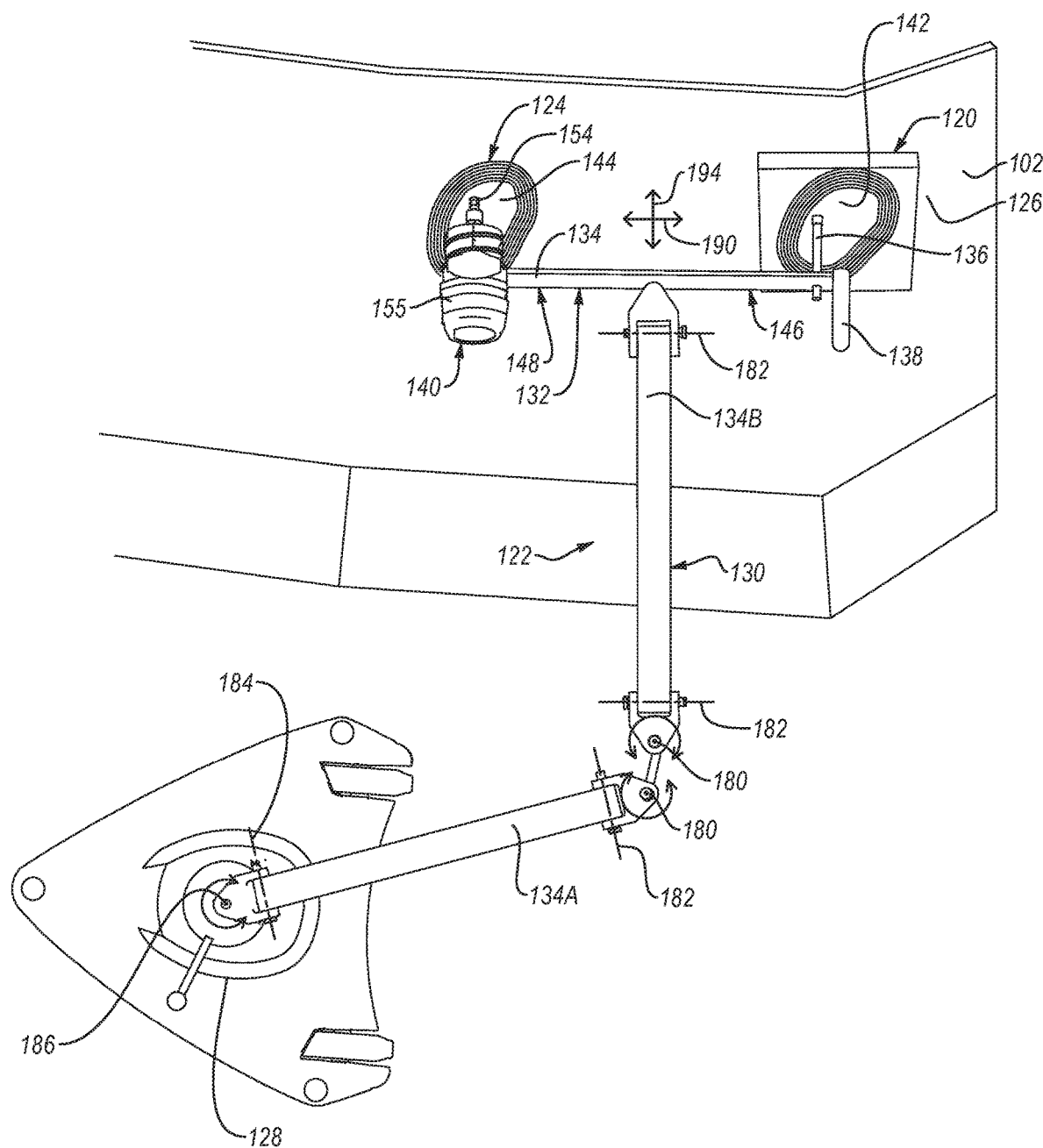
FIG. 5 is a perspective view of the duplicator assembly and the scarf repair guide of the system of FIG. 1, from a top of the duplicator assembly, according to one or more examples of the present disclosure.

The first arm segment 134A is movably coupled to the second arm segment 134B such that the first arm segment 134A is movable relative to the second arm segment 134B. In the illustrated example, as shown in FIG. 5, the second arm segment 134B is pivotable relative to the first arm segment 134A about at least one first rotational axis 180 (e.g., upright axis) and at least one second rotational axis 182 (e.g., horizontal axis). Referring to FIGS. 2 and 3, pivoting of the second arm segment 134B relative to the first arm segment 134A about a first rotational axis 180 allows the arm 134 (including the probe 136 and the milling tool 140) to move translationally in a first linear direction 190 along (e.g., parallel) the part 102. In contrast, also referring to FIGS. 2 and 3, pivoting of the second arm segment 134B relative to the first arm segment 134A about a second rotational axis 182 allows the arm 134 (including the probe 136 and the milling tool 140) to move translationally in a second linear direction 192 along the part 102. The first linear direction 190 is perpendicular to the second linear direction 192.

Referring to FIGS. 2, 3, and 5, in some examples, the duplicator assembly 122 additionally includes a mobile base 128 to which the first arm segment 134A is pivotably fixed. The mobile base 128 is movable along a floor on which the part 102 is supported to move the duplicator assembly 122 to a repair site 124 relative to the part 102. Moreover, once at the repair site 124, the mobile base 128 is selectively lockable (e.g., via lockable casters) to temporarily prevent movement of the mobile base 128 relative to the part 102. The first arm segment 134A is pivotable relative to the mobile base 128 about a third rotational axis 184 and a fourth rotational axis 186. Referring to FIGS. 3 and 5, pivoting of the first arm segment 134A relative to the mobile base 128 about the third rotational axis 184 allows the arm 134 (including the probe 136 and the milling tool 140) to move translationally in the second linear direction 192 along the part 102. In contrast, referring to FIGS. 2, 3, and 5, pivoting of the first arm segment 134A relative to the mobile base 128 about the fourth rotational axis 186 allows the arm 134 (including the probe 136 and the milling tool 140) to move translationally in a third linear direction 194 toward and away from part 102. The third linear direction 194 is perpendicular to the first linear direction 190 and the second linear direction 192. In this manner, the articulatable arm 130 is movable (e.g., articulatable) about at least three axes of rotation such that the probe 136 and the milling tool 140 also are movable about at least three axes of rotation.

Figure 11:
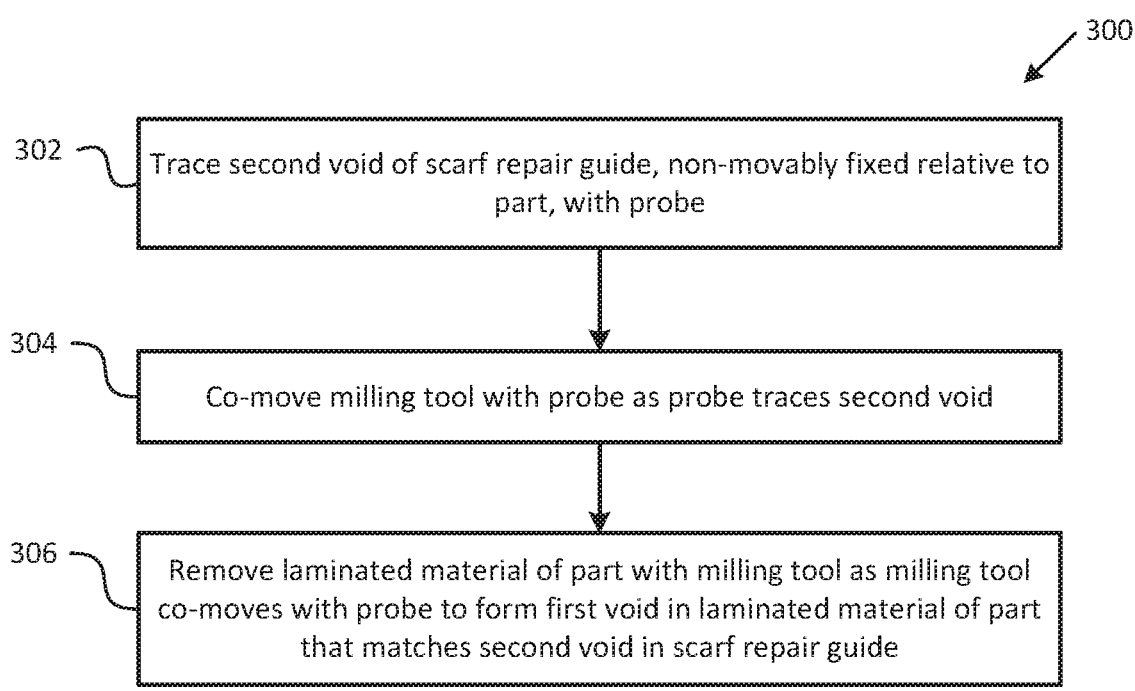
FIG. 11 is a schematic flow chart of a method of repairing a laminated material of a part, according to one or more examples of the present disclosure.

Referring to FIG. 11, after the scarf repair guide 120 is formed, and according to some examples, a method 300 of repairing the part 102 includes non-movably fixing the scarf repair guide 120 relative to the part 102. In certain examples, as shown, the scarf repair guide 120 is attached directly to the part 102, such as to the same surface 126 of the part 102 in which the void 144 is to be formed. The scarf repair guide 120 can be attached to the surface 126 of the part 102 using any of various attachment techniques, such as fastening, bonding, adhesion, and the like. In alternative examples, the scarf repair guide 120 is attached to another structure (e.g., wall, table, jig, fixture, and the like) that is non-movably fixed relative to the part.

The scarf repair guide 120 is non-movably fixed, relative to the part 102, at a location corresponding with a distance D1 between the probe 136, at the first end portion 146 of the arm 134, and the milling tool 140, at the second end portion 148 of the arm 132 (see, e.g., FIG. 6). More specifically, the location of the scarf repair guide 120 is selected such that when the probe 136 is engaged with a given portion of the void 142 of the scarf repair guide 120, the bit 154 of the milling tool 140 is engaged with a matching portion of the void 144 of the part 102 at a desired location of the void 144 on the part 102. Accordingly, the location of the scarf repair guide 120 (e.g., the distance D2 between the desired location of the void 144 and the scarf repair guide 120) is based on the desired location of the void 144 and the distance D1 between the probe 136 and the milling tool 140. The desired location of the void 144 can be generated by the defect modeling module 110 or the scarf repair modeling module 114 based on the scanned data 108. The desired location can then be marked on the part 102 to act as a reference for locating and non-movably fixing the scarf repair guide 120.

After the scarf repair guide 120 is non-movably fixed, relative to the part 102, in a proper location for forming the void 144, the method 300 additionally includes (block 302) tracing the void 142 of the scarf repair guide 120 with the probe 136. In some examples, the step of tracing the void 142, at block 302, includes manually moving the probe 136 along, and in contact with, the probe engaging surface 150 of the scarf repair guide 120 that defines the void 142. The probe 136 is manually moved as an operator grasps the handle 138 of the arm assembly 132 and manually moves the handle 138 relative to the part 102. As described above, movement of the handle 138 results in a corresponding movement of the probe 136 and the milling tool 140. Accordingly, the method 300 further includes (block 304) co-moving the milling tool 140 with the probe 136 as the probe 136 traces the void 142 of the scarf repair guide 120. The method 300 additionally includes (block 306) removing material from the part 102 with the milling tool 140, as the milling tool 140 co-moves with the probe 136, to form the void 144 in the part 102 that matches the void 142 in the scarf repair guide 120. In other words, as the probe 136 traces the void 142 of the scarf repair guide 120, the milling tool 140 is operating to rotate the bit 154 at a cutting rotational speed to cut into and remove material from the part 102 at the proper location for forming the void 144.

As shown in FIG. 7, in some examples, the tip 167 of the probe 159 is offset (e.g., away from the part 102) from the tip of the bit 154 to allow the bit 154 to engage and remove material from the part 102 when the probe 159 is tracing the void 142 and the scarf repair guide 120 is fixed to the part 102. In other examples, due to the contour of the part 102 or the scarf repair guide 120 being fixed to a structure separate from the part, there is no offset between the tip 167 of the probe 159 and the tip of the bit 154 or the offset is inverted.

According to some examples, the step of tracing the void 142 of the scarf repair guide 120 with the probe 136 includes moving the probe 136 along the void 142 according to any one of at least three degrees of freedom. Correspondingly, the step of co-moving the milling tool 140 comprises movement of the milling tool 140 according to any one of the at least three degrees of freedom. More specifically, in certain examples, the void 142 is traced with the probe 136 by moving the probe 136 in the first linear direction 190 and/or the second linear direction 192 (see, e.g., 2) to trace over an 2-dimensional area of the void 142. As shown in FIGS. 6 and 7, the arm assembly 132 is moved from a first position (FIG. 6) to a second position (FIG. 7) in a linear direction parallel to the first linear direction 190 of the second linear direction 192. The tracing of the void 142 by the probe 136 can follow a desired path or tracing pattern, such as a rastering or stepwise pattern, to trace over an entire 2-dimensional area of the void 142. As the 2-dimensional area of the void 142 is traced by the probe 136, the 3-dimensional features of the void 142 are traced with the probe 136 by moving the probe 136 in the third linear direction 194. The operator applies a pressure to the probe 136, via the handle 138, to ensure the probe 136 traces along depthwise contours in the void 142 as the planar shape of the void 142 is traced via tracing in the first linear direction 190 and the second linear direction 192. Such tracing ensures the void 144 in the part 102 being formed, as the void 142 in the scarf repair guide 120 is traced, matches the 2-dimensionsal and 3-dimensional shape of the void 142 in the scarf repair guide 120. Accordingly, the void 144 in the part 102 is formed to precisely fit the abnormality 104 by forming and tracing a void 142 in the scarf repair guide 120 designed to precisely fit the abnormality 104.

In some examples, maintaining the probe 136 perpendicular relative to the probe engaging surface 150 defining the void 142 is desirable to ensure an accurate tracing of the contours of the void 142. Accordingly, in such examples, the method 300 includes pivoting the probe 136 in response to a contour change of the void 142 and co-pivoting the milling tool 140 with the probe 136. In some examples, pivoting the probe 136 includes swiveling the swivelable tip 160 and pivoting the milling tool 140 includes actuating a motor, to pivot the milling tool 140, in response to a detected swiveling of the swivelable tip 160.

After the void 142 of the scarf repair guide 120 is adequately traced to adequately form the matching void 144 in the part 102, the scarf repair guide 120 is removed from the part 102 (if attached to the part). The repair patch 164 is then inserted into and secured in place within the void 144 in the part 102 to complete the scarf repair process. Other steps can be performed, such as pre-processing of the part 102 (e.g., cleaning), before forming the void 144 in the part 102, and/or post-processing of the void 144 (e.g., sanding), after cutting the void 144 but before attachment of the repair patch 162.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for examples may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and program products according to various examples. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed:

1. A duplicator assembly for forming a first void in a laminated material of a part that matches a second void in a scarf repair guide, where the scarf repair guide comprises a physical guide based on a digital scarf repair model, the duplicator assembly comprising:
an arm, comprising a first end portion and a second end portion, wherein the first end portion is spaced apart from the second end portion;
a probe, fixed to the first end portion of the arm and configured to trace the second void in the scarf repair guide; and
a milling tool, fixed to the second end portion of the arm such that the milling tool is co-movably coupled with the probe via the arm.

2. The duplicator assembly according to claim 1, further comprising a handle fixed to the first end portion, wherein the handle is co-movably coupled with the probe.

3. The duplicator assembly according to claim 1, wherein:
the probe is movable relative to the arm in response to a contour change of the second void in the scarf repair guide;
the milling tool is pivotably coupled with the second end portion; and
the milling tool pivots relative to the arm in response to the probe moving relative to the arm.

4. The duplicator assembly according to claim 1, further comprising an articulatable arm coupled to the arm, wherein the articulatable arm is manually movable relative to the part and the scarf repair guide to manually move the arm relative to the part and the scarf repair guide.

5. The duplicator assembly according to claim 4, wherein the articulatable arm is manually movable about at least three axes of rotation such that the probe and the milling tool are manually movable about the at least three axes of rotation.

6. The duplicator assembly according to claim 4, wherein:
the arm, the probe, and the milling tool form an arm assembly; and
the arm assembly is selectively releasably coupled to the articulatable arm.

7. A system for forming a first void in a laminated material of a part to repair the part, the system comprising:
a scarf repair guide, comprising a physical guide based on a digital scarf repair model, non-movably fixed relative to the part and comprising a second void, wherein the first void matches the second void; and
an arm assembly, comprising:
an arm, comprising a first end portion and a second end portion, wherein the first end portion is spaced apart from the second end portion;
a probe, fixed to the first end portion of the arm and configured to trace the second void in the scarf repair guide; and
a milling tool, fixed to the second end portion of the arm such that the milling tool is co-movably coupled with the probe via the arm, wherein the milling tool is configured to form the first void in the part to match the second void in the scarf repair guide as the probe traces the second void in the scarf repair guide.

8. The system according to claim 7, further comprising:
a scarf repair modeling module, configured to generate a digital scarf repair model based at least partially on data corresponding with an abnormality in the part; and
a scarf repair guide forming tool, configured to make the scarf repair guide based on the digital scarf repair model.

9. The system according to claim 8, wherein the scarf repair guide forming tool comprises an additive manufacturing machine.

10. The system according to claim 8, further comprising a defect modeling module, configured to generate a computer-aided design (CAD) model of at least the abnormality in the part based on the data corresponding with the abnormality in the part, wherein the scarf repair modeling module is further configured to generate the digital scarf repair model based at least partially on the CAD model.

11. The system according to claim 10, wherein the scarf repair modeling module is further configured to generate the digital scarf repair model according to scarf repair parameters defined prior to generating the CAD model of at least the abnormality in the part.

12. The system according to claim 10, further comprising a scanning tool, configured to scan the part to generate the data corresponding with the abnormality in the part.

13. The system according to claim 7, wherein:
the arm assembly is further configured to form the first void in a surface of the part; and
the scarf repair guide is non-movably attached to the surface of the part.

14. A method of making a scarf repair guide for repairing a laminated material of a part, the method comprising:
scanning at least a portion of the part containing an abnormality;

generating data corresponding with the abnormality in response to scanning at least the portion of the part containing the abnormality;

generating a digital scarf repair model based at least partially on the data corresponding with the abnormality; and making the scarf repair guide, comprising a physical guide, based on the digital scarf repair model.

15. The method according to claim 14, further comprising generating a computer-aided design (CAD) model of at least the abnormality in the part based on the data corresponding with the abnormality, and wherein the digital scarf repair model is generated based on the CAD model.

16. The method according to claim 14, wherein the data corresponding with the abnormality comprises an orientation of the part, a location of the abnormality on the part, and a shape of the abnormality.

17. A method of repairing a laminated material of a part, the method comprising:

tracing a second void, of a scarf repair guide non-movably fixed relative to the part, with a probe, wherein the scarf repair guide is based on a digital scarf repair model generated by a scarf repair modeling module configured to generate the digital scarf repair model based at least partially on data corresponding with an abnormality in the part;

co-moving a milling tool with the probe as the probe traces the second void; and removing the laminated material of the part with the milling tool as the milling tool co-moves with the probe to form a first void in the laminated material of the part that matches the second void in the scarf repair guide.

18. The method according to claim 17, wherein:

the step of tracing the second void with the probe comprises moving the probe according to any one of at least three degrees of freedom; and the step of co-moving the milling tool comprises movement of the milling tool according to any one of the at least three degrees of freedom.

19. The method according to claim 17, wherein:

the step of tracing the second void with the probe comprises pivoting the probe in response to a contour change of the second void in the scarf repair guide; and the step of co-moving the milling tool comprises co-pivoting the milling tool with the probe.

20. The method according to claim 17, wherein the step of tracing the second void with the probe comprises manually moving the probe along the second void.

* * * * *